3,280,227
PHOSPHATE ESTERS
Robert S. Mitchell, Webster Groves, and William S. Knowles, Kirkwood, Mo., assignors to Monsanto Company, St. Louis, Mo., a corporation of Delaware
No Drawing. Filed Sept. 3, 1963, Ser. No. 306,348
3 Claims. (Cl. 260—951)

This invention realtes to a new class of chemical compounds. More particularly, the invention relates to novel methyl phenoxyphenyl phosphate esters. These compounds have been found to be useful as base stocks for high temperature fluids and lubricants.

The novel methyl phenoxyphenyl phosphate esters of the invention have the general formula

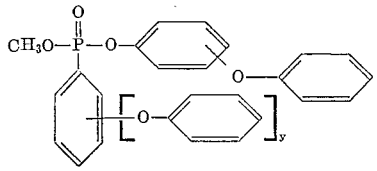

wherein $y$ is an integer from 0 to 1.

It has been found that the desired methyl phenoxyphenyl phosphates of this invention can be readily prepared by reacting methanol with the reaction product of phosphorous oxychloride or a phenylphosphorochloridate and a phenoxyphenol or phenoxyphenols.

The invention will be more fully under stood by reference to the following examples which describe the detailed preparation of representative compounds. Such examples are given for the purpose of illustration only, and are not to be construed as limiting the scope of this invention in any way.

EXAMPLE I

A suitable reaction vessel is charged with 52.8 grams (0.25 mole) of phenyl phosphorodichloride followed by 0.14 gram of aluminum chloride. There is then added 46.5 grams (0.25 mole) of m-phenoxyphenol over a period of about ½ hour during which time the mixture is maintained at 90–100° C. Upon completion of the addition of the m-phenoxyphenol, the reaction mixture is cooled to 20–25° C. 24.2 grams (0.75 mole) of methanol is then added to the phenyl m-phenoxyphenyl phosphormonochloridate prepared in the previous reaction. The temperature of the reaction mixture is maintained at 20–25° C. during the addition of the methanol and for an additional hour thereafter to ensure completion of the reaction. The resultant reaction mixture is quenched with 250 ml. of ice water and washed several times with lye and water. The reaction mixture is then dehydrated under vacuum. There is obtained 78.8 grams (88.5% of theory) of methyl phenyl m-phenoxyphenyl phosphate having a pour point of about −20° C.

EXAMPLES II–III

Following the procedure of Example I, 0.25 mole of each of the phenoxyphenols tabulated below is substituted for the m-phenoxyphenol. The product obtained in each instance is as indicated.

II phenol=o-phenoxyphenol
product=methyl phenyl o-phenoxyphenyl phosphate

III

Phenol=p-phenoxyphenol
Product=methyl phenyl p-phenoxyphenyl phosphate

EXAMPLE IV

A suitable reaction vessel is charged with 38.3 grams (0.25 mole) of phosphorous oxychloride followed by 0.25 gram aluminum chloride. There is added 93.1 grams (0.50 mole) of m-phenoxyphenol over a period of about 2 hours. The mixture is maintained at 100–105° C. during addition of the m-phenoxyphenol. The reaction mixture is maintained at this temperature an additional 2 hours to ensure completion of the reaction. The resultant reaction mixture is cooled to 20–25° C., and 24.0 grams (0.75 mole) of methanol is added. The temperature of the reaction mixture is maintained at 20–25° C. for about 1 hour after the methanol addition is complete. The resultant reaction mixture is quenched with 250 ml. of ice water and washed several times with lye and water. The reaction mixture is then dehydrated under vacuum. There is obtained methyl di(m-phenoxyphenyl) phosphate in good yield.

EXAMPLES V–VI

Following the procedure of Example IV, 0.50 mole of each of the phenoxyphenols tabulated below is substituted for the m-phenoxyphenol. The product obtained in each instance is as indicated.

V

Phenol=o-phenoxyphenol
Product=methyl di(o-phenoxyphenyl)phosphate

VI

Phenol=p-phenoxyphenol
Product=methyl di(p-phenoxyphenyl)phosphate

EXAMPLE VII

A suitable reaction vessel is charged with 38.3 grams (0.25 mole) of phosphorous oxychloride followed by 0.14 gram of aluminum chloride. There is then added 46.5 grams (0.25 mole) of m-phenoxyphenol over a period of about 1 hour. The mixture is maintained at 100–105° C. during the addition of the m-phenoxyphenol. Upon completion of the addition of the m-phenoxyphenol, an additional 0.14 gram of aluminum chloride is added to the reaction mixture. 46.5 (0.25 mole) of p-phenoxyphenol is then added to the reaction mixture over a period of about 1 hour. The temperature of the reaction mixture is maintained at 100–105° C. during the addition of p-phenoxyphenol. The resultant reaction mixture is then cooled to 20–25° C., and 24.0 grams (0.75 mole) of methanol is added. The temperature of the reaction mixture is maintained at 20–25° C., for about 1 hour after the methanol addition is complete. The reaction mixture is worked up as in Example IV, and methyl m-phenoxyphenyl p-phenoxyphenyl phosphate is obtained in good yield.

EXAMPLES VIII–IX

Following the procedure of Example VII 0.25 mole of each of the phenoxyphenols tabulated below is substituted for the m- and p-phenoxyphenols. The product obtained in each instance is as indicated.

VIII

Phenols=o-phenoxyphenol, p-phenoxyphenol
Product=methyl o-phenoxyphenol p-phenoxyphenol phosphate

IX

Phenols=o-phenoxyphenol, m-phenoxyphenol
Product=methyl o-phenoxyphenol m-phenoxyphenol phosphate As will be apparent to those skilled in the art, mixed phenoxyphenols can be used in the preparation of the novel phospate esters of the invention.

As previously stated, the products of this invention are useful as base stocks for high temperature fluids and lubricants. The advantageous properties possessed by the esters of this invention are illustrated by the following data, obtained on methyl phenyl m-phenoxyphenol phosphate.

| | |
|---|---|
| Thermal stability °F | *549 |
| Viscosity, cs., 15° F | 6289.0 |
| Viscosity, cs., 100° F | 47.21 |
| Viscosity, cs., 210° F | 5.61 |
| Viscosity Index | +37 |

*Temperature of first gas evolution (0.2 g. millimole per minute per kilo).

Other compounds within the scope of this invention are found to possess properties of similar nature.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A compound of the formula

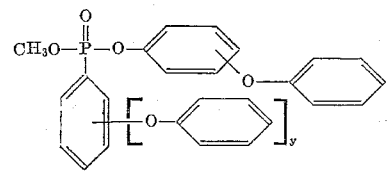

wherein $y$ is an integer from 0 to 1.

2. Methyl phenyl phenoxyphenol phosphate.
3. Methyl di(phenoxyphenyl)phosphate.

No references cited.

CHARLES B. PARKER, *Primary Examiner.*

FRANK M. SIKORA, *Assistant Examiner.*